United States Patent
Yamazaki et al.

(10) Patent No.: US 10,046,493 B2
(45) Date of Patent: Aug. 14, 2018

(54) METHOD FOR MANUFACTURING CUP-SHAPED CONTAINER

(71) Applicants: NISSEI PLASTIC INDUSTRIAL CO., LTD., Nagano (JP); Setsuko Takeuchi

(72) Inventors: Minoru Yamazaki, Nagano (JP); Yasuhiko Takeuchi, Nagano (JP); Hiromitsu Miyajima, Nagano (JP)

(73) Assignee: NISSEI PLASTIC INDUSTRIAL CO., LTD., Nagano (JP)

( * ) Notice: Subject to any disclaimer, the term of this patent is extended or adjusted under 35 U.S.C. 154(b) by 206 days.

(21) Appl. No.: 15/151,282

(22) Filed: May 10, 2016

(65) Prior Publication Data
US 2016/0339617 A1    Nov. 24, 2016

(30) Foreign Application Priority Data
May 22, 2015    (JP) .................. 2015-104655

(51) Int. Cl.
*B29C 45/16* (2006.01)
*B29L 31/00* (2006.01)
*B29C 45/14* (2006.01)

(52) U.S. Cl.
CPC .... *B29C 45/1671* (2013.01); *B29C 45/14598* (2013.01); *B29C 45/1603* (2013.01);
(Continued)

(58) Field of Classification Search
CPC .......... B29C 45/1603; B29C 2045/161; B29C 45/14598; B29L 2031/7132
See application file for complete search history.

(56) References Cited

U.S. PATENT DOCUMENTS 5,935,615 A * 8/1999 Gellert ............... B29C 45/1603
425/130
6,099,780 A * 8/2000 Gellert ............... B29C 45/1603
264/255
(Continued)

FOREIGN PATENT DOCUMENTS

JP        04-31018 A    2/1992
JP        05-026340 A    2/1993
(Continued)

*Primary Examiner* — Nahida Sultana
(74) *Attorney, Agent, or Firm* — McDermott Will & Emery LLP

(57) ABSTRACT

A thin multilayer container having favorable gas barrier properties is provided using a technique applicable to the molding of the thin multilayer container, by means of ensuring the gas barrier properties at a joint of ends of a film, when the container is molded with disposing the film having the gas barrier properties in a portion to be a container trunk portion.

When molding the container with disposing in advance the film having the gas barrier properties in the portion to be the container trunk portion, while a container surface resin is fed from an injection molding nozzle into a container trunk forming portion of a mold, a gas barrier resin is fed into a position corresponding the joint of the label film as an intermediate layer between a portion of the container surface resin being spread along a core mold and a portion of the container surface resin being spread along a cavity mold.

3 Claims, 6 Drawing Sheets

(52) U.S. Cl.
CPC ............... *B29C 2045/161* (2013.01); *B29C 2045/1682* (2013.01); *B29K 2995/0067* (2013.01); *B29L 2031/7132* (2013.01)

(56) References Cited

U.S. PATENT DOCUMENTS

| | | | | |
|---|---|---|---|---|
| 2001/0010848 | A1* | 8/2001 | Usui | B29C 51/006 428/36.5 |
| 2003/0161977 | A1* | 8/2003 | Sabin | B29C 45/1603 428/35.7 |
| 2012/0318805 | A1* | 12/2012 | Leser | B65D 3/14 220/592.17 |
| 2013/0095265 | A1* | 4/2013 | Mitadera | B29C 45/1603 428/36.7 |
| 2014/0272283 | A1* | 9/2014 | Swenson | B29C 45/231 428/137 |
| 2015/0174803 | A1* | 6/2015 | Newman | B29C 45/14 264/40.1 |
| 2018/0133938 | A1* | 5/2018 | Duffy | B29C 45/1603 |

FOREIGN PATENT DOCUMENTS

| | | | |
|---|---|---|---|
| JP | 2006-056559 | A | 3/2006 |
| JP | 2008-307846 | A | 12/2008 |
| JP | 5050679 | B2 | 10/2012 |

\* cited by examiner

METHOD FOR MANUFACTURING CUP-SHAPED CONTAINER

This application claims priority to Japanese application No. 2015-104655 filed on May 22, 2015.

BACKGROUND OF THE INVENTION

1. Field of the Invention

The present invention relates to a method for manufacturing a cup-shaped container having gas barrier properties by injection molding in a state of disposing a label film having gas barrier properties around a trunk of the container.

2. Description of the Related Art

As containers made of a synthetic resin material, there are multilayer containers made of two different kinds of resins to provide an objective function, and containers provided with a film having an objective function on the outer surface of the container. The multilayer containers include two container surface layers (an inner surface layer and an outer surface layer of the container) made of one of the resins, and a container intermediate layer that is disposed and sandwiched between the two container surface layers and made of the other resin that can exert the objective function.

In the containers provided with a film on the outer surface of the container, the film having the objective function is disposed on the outer surface of the container by in-mold molding.

For example, Patent Literature 1 describes a multilayer container made of a surface layer forming resin, an oxygen barrier resin, and an adhesive resin that are injected from one injection molding nozzle, so as to form a layer of the oxygen barrier resin as an intermediate layer.

Patent Literature 2 describes a multilayer container in which an oxygen barrier resin layer is formed between two resin layers of a container surface resin by stacking the resins fed by a plurality of injection molding machines into layers using a laminar flow member (torpedo) and feeding the resins into a mold.

Patent Literature 3 describes a multilayer container manufactured by feeding resins from an injection molding nozzle so as to make a polyolefin resin layer, a gas barrier resin layer, and another polyolefin resin layer and arrange them from the outer surface to the inner surface the container.

Moreover, Patent Literatures 4 and 5 describe a multilayer container formed by in-mold molding. Patent Literatures 4 and 5 show that, while injecting resins, a film or metal foil is disposed in a mold at a container trunk forming portion at a portion to be the outer or inner periphery of a container trunk portion, and also that when a container bottom forming portion is molded, a synthetic resin having gas barrier properties or light blocking properties is co-injected together with a synthetic resin for the container main body.

[Patent Literature 1] Japanese Patent Application Laid-Open No. Hei. 04-031018

[Patent Literature 2] Japanese Utility Model Application Laid-Open No. Hei. 05-026340

[Patent Literature 3] Japanese Patent Application Laid-Open No. 2008-307846

[Patent Literature 4] Japanese Patent Application Laid-Open No. 2006-056559

[Patent Literature 5] Japanese Patent No. 5050679

By the way, in the container industry, containers having thin walls have been developed from the viewpoint of a reduction in weight and cost of the containers.

As to the multilayer containers having the intermediate layer described in the patent literature 1-3, however, it is technically difficult to form the intermediate layer uniformly in the entire container, while thinning its walls. Also, under the present circumstances, multilayer molding that is conditional on thin walls is hard to use as a mass production technique for the containers, which requires stability for mass production.

Although a multilayer preform is known as a similar molded article by multilayer molding (see Japanese Patent No. 4953178), the preform itself is a molded article having a thick wall, which is to be stretched and thinned to a final thickness of a container by stretch blowing or the like. The multilayer preform without modification cannot be applied as is to a thin wall multilayer molding technique to injection mold multilayer containers.

On the other hand, in recent years, as described in Patent Literatures 4 and 5, a film having gas barrier properties is integrated with a molding resin of a container main body as the exterior of a container, to improve gas barrier properties or light blocking properties. The technique of molding a gas barrier layer from a resin having gas barrier properties is applied to only the bottom portion of a container at which the film is difficult to be integrated.

However, to wrap the film around the periphery of the container trunk portion in an integral manner, bonded faces are necessarily required in the film at its ends. Depending on the thickness and manner of overlapping of the bonded faces, it is difficult to impart expected gas barrier properties at a bonded portion.

SUMMARY OF THE INVENTION

Considering the circumstances described above, the present invention aims to ensure gas barrier properties at a joint portion at ends of a film in a container trunk portion of a container that is molded with disposing a film having gas barrier properties in a portion to be the container trunk portion. It is an object of the present invention to provide a thin multilayer container having favorable barrier properties using a technique applicable to the molding of a thin multilayer container.

(A First Embodiment of the Present Invention)

The present invention has been made with consideration of the above objects. To achieve the above objects, there is provided a method for manufacturing a cup-shaped multilayer container having gas barrier properties by in-mold molding, in which a flat label film that has the gas barrier properties with a length winding around a container trunk portion to make a joint portion with its ends together is disposed in advance and in-mold at a position of a container trunk forming portion of a mold for the cup-shaped container on an inward side of a cavity mold, and resins are injected and fed from an injection molding nozzle of which a nozzle gate faces a container bottom forming portion of the mold, into a container inner side relative to the label film to integrate the label film with the resin. The method includes:

while feeding a container surface resin from the injection molding nozzle into the container trunk forming portion of the mold, feeding a gas barrier resin into the container trunk forming portion in a strip manner at an intermediate layer portion between a portion of the container surface resin being spread along a core mold and a portion of the container surface resin being spread along the cavity mold in a position corresponding to the joint of the label film; and after feeding the gas barrier resin into the container trunk forming portion, while feeding the container surface resin from the injection molding nozzle into the container bottom forming portion of the mold, feeding the gas barrier resin into the container bottom forming portion in a plane manner at the intermediate layer portion between the portions of the container surface resin, so as to form the cup-shaped container that has a longitudinal strip-shaped gas barrier layer made of the gas barrier resin on a container inner side relative to the joint of the label film in the container trunk portion and a plane-shaped gas barrier layer in a container bottom, the longitudinal strip-shaped gas barrier layer and the plane-shaped gas barrier layer being continuous with each other.

(Effects of the First Embodiment of the Present Invention)

The label film having the gas barrier properties and a length winding around the container trunk portion of the cup-shaped container is disposed in the container trunk forming portion of the mold on the side of the cavity mold before injection. When feeding the resins into the mold, the container surface resin and the gas barrier resin are concurrently fed (co-injection molding), and the gas barrier resin is fed in a strip manner into the position corresponding to the joint of the label film as the intennediate layer, to form the longitudinal strip-shaped gas barrier layer made of the gas barrier resin in the position corresponding to the joint or seam of the label film on the container inner side in the container trunk portion of the cup-shaped container. Therefore, it is possible to obtain the container that ensures the expression of the gas barrier properties at a portion corresponding to the joint or seam portion of the label film being wound.

In the manufactured cup-shaped container, since the label film is wound around the outer periphery of the container trunk portion and the gas barrier layer is formed covering the portion corresponding to the joint or seam portion of the label film on the container inner side, such formation of the gas barrier layer has a high degree of flexibility, without addition of any condition such as a constant width of the gas barrier layer itself in the container trunk portion.

Furthermore, the formation of the intermediate layer (gas barrier layer) only in the portion corresponding to the joint or seam portion of the label film eliminates the need for providing the intermediate layer throughout the entire container, thus serving to thin the container.

(A Second Embodiment of the Present Invention)

In the present invention, the injection molding nozzle includes a pin passage that has the nozzle gate at a distal end and a valve pin disposed to be movable in the pin passage;

a first resin discharge port for the container surface resin faces the pin passage at a foremost position close to the nozzle gate, a second resin discharge port for the container surface resin faces the pin passage at a rear position on an opposite side of the first resin discharge port to the nozzle gate, a resin discharge port for the gas barrier resin faces the pin passage at a midpoint between the first and second resin discharge ports for the container surface resin, and the valve pin is capable of opening or closing the first and second resin discharge ports for the container surface resin and the resin discharge port for the gas barrier resin;

the valve pin has a groove that is formed in an outer periphery of the valve pin and reaches a distal end of the valve pin, and a communication passage that extends from a communication hole opened in the outer periphery of the valve pin to a discharge port positioned at the distal end of the valve pin;

when the valve pin is moved backward from a nozzle gate closing position, and the groove of the valve pin faces the resin discharge port for the gas barrier resin so as to open the resin discharge port for the gas barrier resin through the groove, the valve pin situated at the rear of the first resin discharge port opens the first resin discharge port, and the communication hole of the communication passage of the valve pin faces the second resin discharge port so as to open the second resin discharge port;

opening the first resin discharge port forms a resin flow path in which the container surface resin flows from the first resin discharge port to a side of the cavity mold;

opening the resin discharge port for the gas barrier resin through the groove forms a resin flow path in which the gas barrier resin flows in a linear manner by being guided through the groove into a portion corresponding to the joint of the label film; and opening the second resin discharge port forms a resin flow path in which the container surface resin flows from the second resin discharge port to a side of the core mold by being guided through the communication passage.

(Effects of the Second Embodiment of the Present Invention)

According to the invention of claim 2, the groove is formed in the outer periphery of the valve pin so as to extend to the distal end of the valve pin. The groove feeds the gas barrier resin from the resin discharge port for the gas barrier resin to the side of the joint of the label film, so that the gas barrier layer is easily formed in the portion corresponding to the joint portion of the label film.

Also, the outer periphery of the valve pin is simplified in shape, thus improving maintainability.

(A Third Embodiment of the Present Invention)

In the present invention, the multilayer cup-shaped container made of at least three resin layers is manufactured by:

a first step of moving the valve pin of the injection molding nozzle backward from the nozzle gate closing position to a position in which the groove faces the resin discharge port for the gas barrier resin, to open the first resin discharge port, the second resin discharge port through the communication passage, and the resin discharge port for the gas barrier resin through the groove, so that the container surface resin is fed from the first resin discharge port to the side of the cavity mold, the container surface resin is fed from the second resin discharge port to the side of the core mold, and the gas barrier resin is fed from the resin discharge port for the gas barrier resin into the portion corresponding to the joint of the label film by being guided through the groove, and thereby the container trunk portion that has the longitudinal strip-shaped gas barrier layer made of the gas barrier resin in a portion to be an intermediate layer between the container surface resin on the side of the core mold and the container surface resin on the side of the cavity mold in the position corresponding to the joint of the label film is formed in the container trunk forming portion of the mold;

a second step of, after completing feeding of the resins by an amount corresponding to the container trunk forming portion in the first step, moving the valve pin backward from the position in which the groove faces the resin discharge port for the gas barrier resin to a position at the rear of the second resin discharge port, to open the first and second resin discharge ports and the resin discharge port for the gas barrier resin, so that the container surface resin is fed from the first resin discharge port to the side of the cavity mold, the container surface resin is fed from the second resin discharge port to the side of the core mold, and the gas barrier resin is fed between two layers of the container surface resin, and thereby the container bottom having the plane-shaped gas barrier layer, which is made of the gas barrier resin and continuous from the longitudinal strip-shaped gas barrier layer, is formed in the container bottom forming portion of the mold in a portion to be the intermediate layer between the container surface resin on the side of the core mold and the container surface resin on the side of the cavity mold; and a third step of, after completing feeding of the resins into the container bottom forming portion of the mold, moving the valve pin forward to close the first and second resin discharge ports and the resin discharge port for the gas barrier resin by the valve pin.

(Effects of the Third Embodiment of the Present Invention)

According to the invention of claim 3, since the longitudinal strip-shaped gas barrier layer that corresponds to the joint portion of the label film in the container trunk portion is continuous from the plane-shaped gas barrier layer in the container bottom, it is possible to improve the gas barrier properties over the container bottom through the container trunk portion.

DETAILED DESCRIPTION OF THE INVENTION (Cup-Shaped Container)

The present invention will be hereinafter described in detail on the basis of an embodiment shown in FIGS. 1 to 7.

Figure 1:
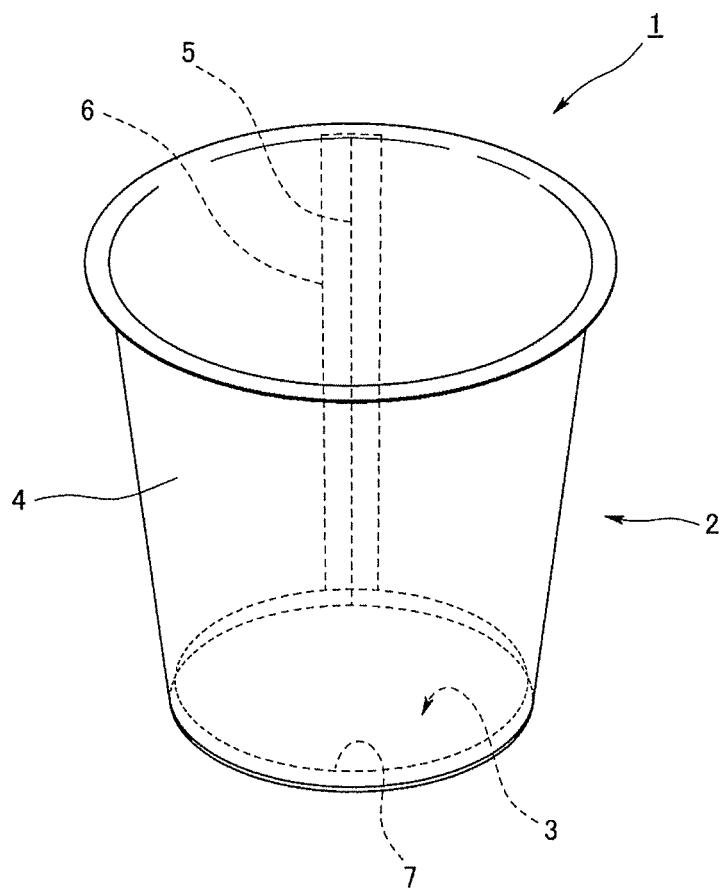
FIG. 1 is an explanatory view showing a cup-shaped container manufactured by an example of a method for manufacturing a cup-shaped container according to the present invention.
Figure 2:
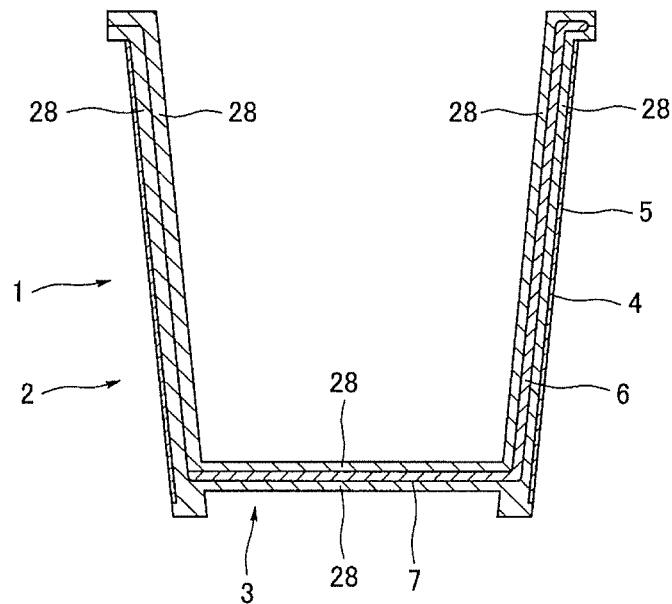
FIG. 2 is an explanatory view showing the cup-shaped container in its cross section.

FIGS. 1 and 2 show a cup-shaped container 1 that is manufactured by the present invention. The cup-shaped container 1 includes a container trunk portion 2 and a container bottom 3 integrated into one unit. The diameter of the container trunk portion 2 preferably increases with height, and the top of the container trunk portion 2 is opened. The container bottom 3 is situated under the container trunk portion 2.

In the outer periphery of the container trunk portion 2 of the cup-shaped container 1, a flat label film 4 having gas barrier properties with a length winding around a container trunk portion 2 is disposed throughout the container trunk portion 2 in a circumferential direction. The flat film 4 of the present invention may be similar in shape or in its handling of a film for a label used for display or printing fields. The cup-shaped container 1 is manufactured by an in-mold molding method in which the label film 4 in a wound state is disposed in a mold to be integrated with a molding resin, as described later.

In the container trunk portion 2, a longitudinal strip-shaped gas barrier layer 6 is formed as an inner layer of a molding material for the container trunk portion 2 so as to be located at a position corresponding to a joint portion 5 of the label film 4 on a container inner side. Here, the joint portion 5 is formed by butt joining with its ends together or overlapping its ends of the label film 4 to each other preferably without any adhesive means. The label film 4 has a length to wind around the container trunk portion 2.

Also in the container bottom 3, a plane-shaped gas barrier layer 7 that is continuous from a side of the longitudinal strip-shaped gas barrier layer 6 is formed as an inner layer of a molding material for the container bottom 3. The plane-shaped gas barrier layer 7 is disposed over the entire container bottom 3.

As described above, in the cup-shaped container 1, the label film 4 having the gas barrier properties is integrally disposed on the outer periphery of the container trunk portion 2. The longitudinal strip-shaped gas barrier layer 6 is disposed at a position corresponding to the joint 5 of the label film 4 on the container inner side, as an intermediate layer. The plane-shaped gas barrier layer 7 is disposed over the container bottom 3, as an intermediate layer. Thereby, the cup-shaped container of the present invention has the gas barrier properties in the entire outer surface, that is, in both of its trunk and bottom. The container may be covered with a lid having gas barrier properties (not shown).

(Manufacturing Device)

Figure 4:
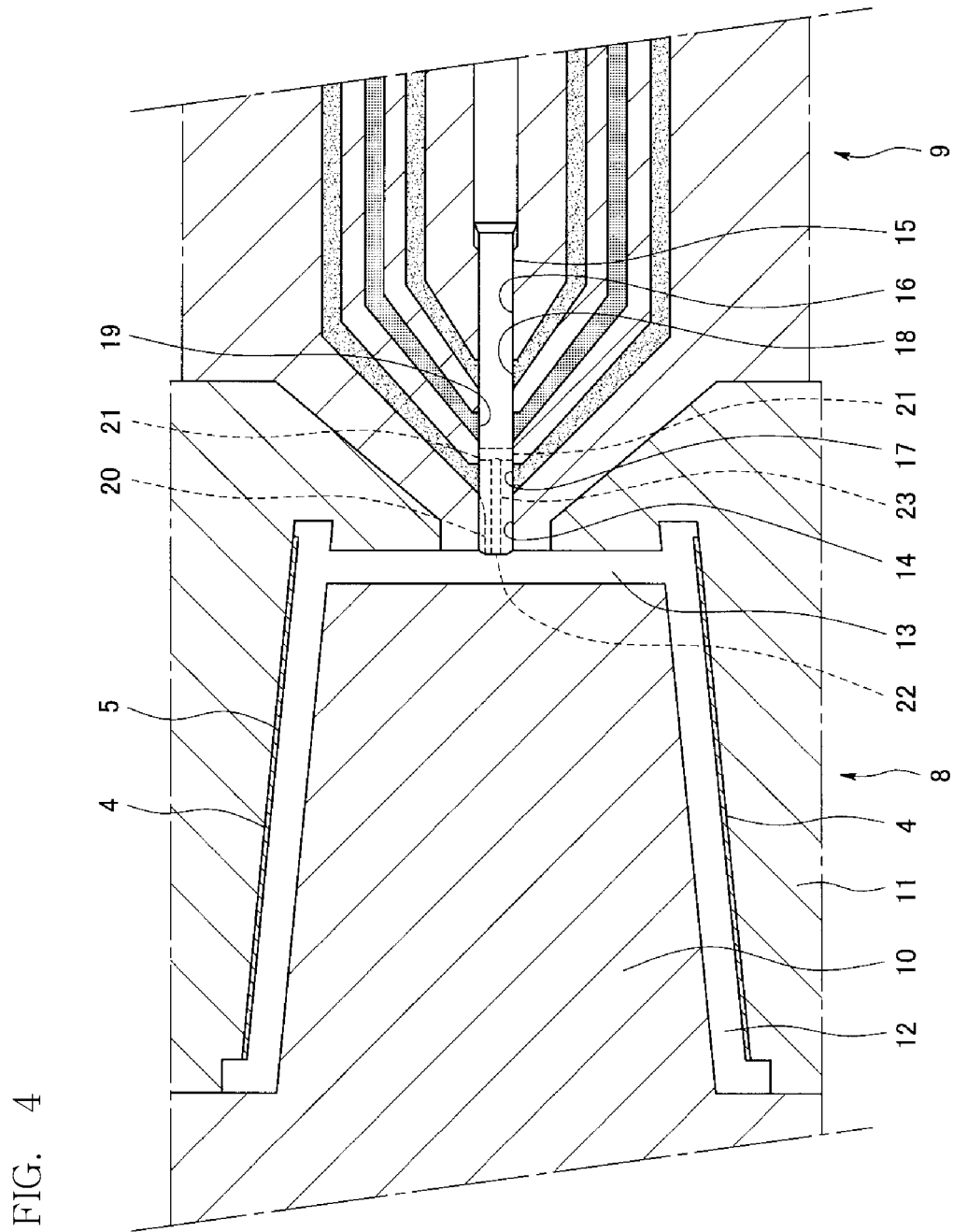
FIG. 4 is an explanatory view schematically showing a mold and an injection nozzle before feeding resins in its cross section, by way of example.
Figure 5:
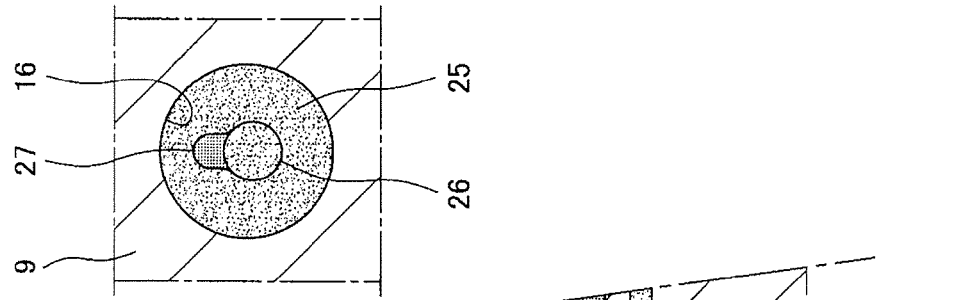
FIG. 5A is an explanatory view schematically showing the mold and the injection nozzle, when feeding the resins into a container trunk forming portion in its cross section, by way of example.
FIG. 5B is an explanatory view schematically showing resin flow paths formed in a pin passage, when feeding the resins into the container trunk forming portion in its cross section, by way of example.
Figure 5:
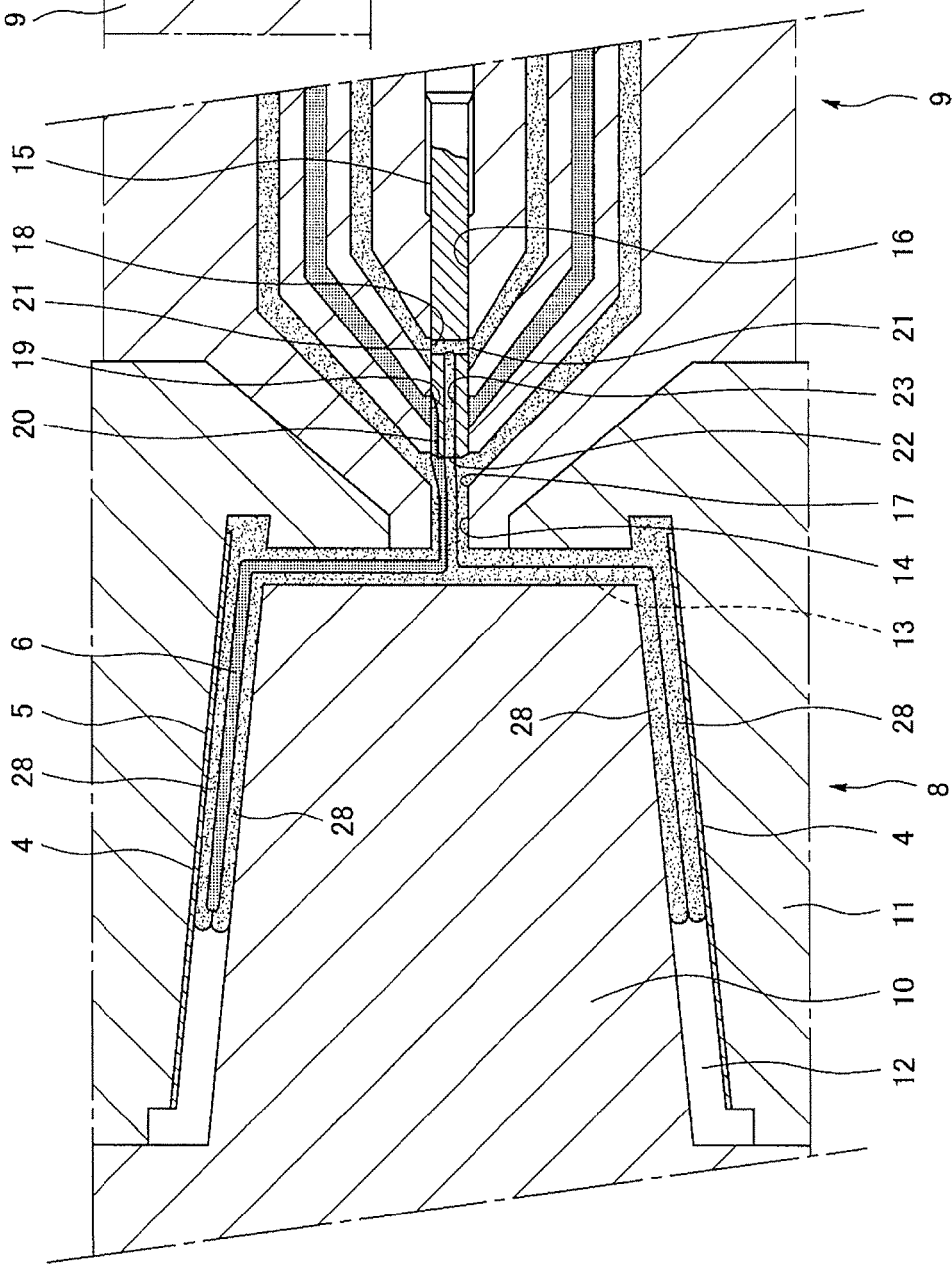

Next, a device for manufacturing the cup-shaped container 1 will be described. FIG. 4 schematically shows an essential portion of an injection molding apparatus for molding the cup-shaped container 1. The injection molding apparatus is configured by integrally assembling an injection molding nozzle 9 of a hot runner nozzle type or the like to a mold 8 for the cup-shaped container 1, so that molten resins are fed from resin suppliers of extruders (not shown) of injection molding machines into the injection molding nozzle 9. The injection molding apparatus produces a plurality of cup-shaped containers by using multiple cavity molding, for example.

The mold 8 includes a combination of a core mold 10 (movable side) and a cavity mold 11 (fixed side). A container forming portion formed between the core mold 10 and the cavity mold 11 includes a container trunk forming portion 12 and a container bottom forming portion 13 continuous with each other.

(Injection Molding Nozzle)

The injection molding nozzle 9 is attached such that a nozzle gate 14 faces the container bottom forming portion 13 on the side of the cavity mold 11 preferably at a center position thereof.

The injection molding nozzle 9 is provided with a pin passage 16, which has the nozzle gate 14 at its distal end and contains a rod-shaped valve pin 15 therein in a movable manner along the passage upwardly or downwardly. Into the pin passage 16, a container surface resin is fed from a not shown injection molding machine and a gas barrier resin is fed from another injection molding machine. The container surface resin and the gas barrier resin are fed from the pin passage 16 through the nozzle gate 14 into the mold 8.

As shown in FIG. 4, a first resin discharge port 17 is formed in the pin passage 16 at the foremost position close to the nozzle gate 14, so as to feed the container surface resin into the pin passage 16. The first resin discharge port 17 is opened throughout the pin passage 16 in an inner circumferential direction.

Also, a second resin discharge port 18 faces the pin passage 16 at the rear position on an opposite side of the first resin discharge port 17 to the nozzle gate 14, so as to feed the container surface resin into the pin passage 16. The second resin discharge port 18 is opened throughout the pin passage 16 in the inner circumferential direction.

The container surface resin fed from the first resin discharge port 17 and the container surface resin fed from the second resin discharge port 18 are the same resin. The same container surface resin supplied from the single injection molding machine passes through a not shown branch runner, and is fed through the first and second resin discharge ports 17 and 18 into the pin passage 16.

A third resin discharge port 19 faces the pin passage 16 at the midpoint between the first resin discharge port 17 and the second resin discharge port 18, so as to feed the gas barrier resin into the pin passage 16. The third resin discharge port 19 is opened throughout the pin passage 16 in the inner circumferential direction.

The gas barrier resin is supplied from the other inject molding machine to the third resin discharge port 19. Specifically, the gas barrier resin is fed to the third resin discharge port 19 through a runner different from runners connected to the first and second resin discharge ports 17 and 18.

(Valve Pin)

The valve pin 15 moves along the pin passage 16 to open or close each of the first, second, and third resin discharge ports 17, 18, and 19.

Figure 3:
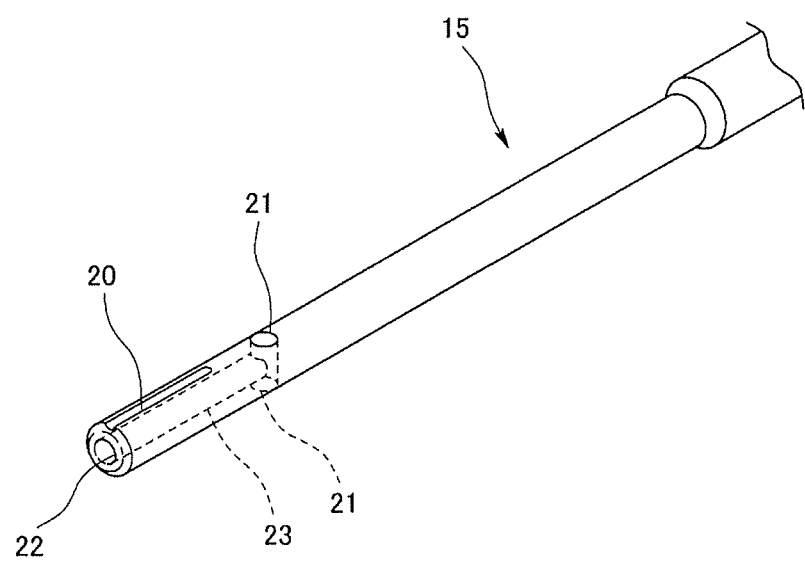
FIG. 3 is an explanatory view of a valve pin.

As shown in FIG. 3, a groove 20 is formed in the outer surface of the valve pin 15 along a pin length direction so as to reach a distal end of the valve pin 15 from below a communication hole 21 (as shown for below).

When the groove 20 faces the third resin discharge port 19 with the valve pin 15 sliding within the pin passage 16, the third resin discharge port 19 is opened only at a portion of the groove 20, so that the gas barrier resin is fed through the groove 20 via the third resin discharge port 19 in a linear manner to the nozzle gate 14 so as to make a longitudinal strip-shaped gas barrier layer.

The valve pin 15 is also provided therein with a communication passage 23 that communicate with a communication hole 21, which is opened in the outer periphery of the valve pin 15 at the rear (upward) of the groove 20, and extends from the communication hole 21 to a discharge port 22 opened at the center of a distal end face of the valve pin 15.

When the communication hole 21 faces the second resin discharge port 18 with the valve pin 15 sliding within the passage 23, the second resin discharge port 18 is opened through the communication hole 21 and the communication passage 23 to the discharge port 22, so that the container surface resin from the second resin discharge port 18 is fed from the discharge port 22 at the distal end of the valve pin 15 to the nozzle gate 14. In addition, at the same time as the communication hole 21 faces the second resin discharge port 18 as above, the groove 20 faces the third resin discharge port 19 as below explained.

(Manufacture of a Cup-Shaped Container)

The in-molding of the cup-shaped container 1 by feeding the container surface resin and the gas barrier resin into the mold 8 by the injection molding nozzle 9 will be described below.

First, in a step placing a label film in mold, the mold 8 is opened and the label film 4 is placed in the container trunk forming portion 12 on the cavity mold 11 to wind around the container trunk forming portion inward of the cavity mold 11 to make the joint portion 5 jointing its ends of the length of the label film 4. Then, the mold 8 is closed and clamped.

At this time, the label film 4 is placed such that the joint 5 is situated at a predetermined position in the container trunk forming portion 12. As above described, the joint portion 5 is formed by butt joining or overlapping ends of the label film 4 to each other with adhesives if necessary. Overlapping is preferably being lesser because of thin wall molding.

(First Step)

Next to deposition of the label film 4, in a first step, the resins are fed into the container trunk forming portion 12 of the mold 8 to form the container trunk portion.

In the first step, while the container surface resin is fed from the injection molding nozzle 9 into the container trunk forming portion 12, the gas barrier resin is also fed thereinto. The gas barrier resin forms the intermediate layer between a portion of the container surface resin being spread along the core mold 10 and a portion of the container surface resin being spread along the cavity mold 11. The gas barrier resin is fed in a strip manner into a position corresponding to the joint 5 of the label film 4.

FIG. 4 shows a molding state after completing the clamping, but before injecting the resins.

The valve pin 15 is situated in a nozzle gate closing position in which the distal end of the valve pin 15 contacts the container bottom forming portion 13 of the mold 8, so that the valve pin 15 closes all of the first resin discharge port 17, the third resin discharge port 19, and the second resin discharge port 18 simultaneously.

First at the start, the valve pin 15 is moved backward (upward) from the nozzle gate closing position in a direction opposite to the mold 8 to a position in which the groove 20 faces the third resin discharge port 19.

FIG. 5A shows a molding state in which the valve pin 15 is moved backward to the position in which the groove 20 faces the third resin discharge port 19. The valve pin 15 that is moved backward as shown in FIG. 5A opens the first resin discharge port 17, opens the second resin discharge port 18 through the communication passage 23, and partly opens the third resin discharge port 19 through the groove 20.

A resin flow path 25 is formed to feed the container surface resin from the first resin discharge port 17 to the side of the cavity mold 11 in the container trunk forming portion 12 as FIG. 5B shows below.

A resin flow path 26 is formed to feed the container surface resin from the second resin discharge port 18 to the side of the core mold 10 in the container trunk forming portion 12 as FIG. 5B shows below.

Furthermore, a resin flow path 27 is formed to feed the gas barrier resin from the third resin discharge port 19 into a portion corresponding to the joint 5 of the label film 4 by being guided through the groove 20 as FIG. 5B shows below.

FIG. 5B shows the resin flow paths 25, 26, and 27 of the above in the pin passage 16.

The backward movement of the valve pin 15 can cause the container surface resin and the gas barrier resin to be co-injected. As shown in FIG. 5B, the resin flow path 26 of the container surface resin fed through the communication passage 23 of the valve pin 15 is situated at the center of the pin passage 16. The resin flow path 25 of the container surface resin fed from the foremost first resin discharge port 17 is situated along the inner periphery of the pin passage 16. The resin flow path 27 of the gas barrier resin fed by being guided through the groove 20 is formed linearly along a resin feeding direction between the resin flow path 26 leading to the side of the cavity mold 11 and the resin flow path 25 leading to the side of the core mold 10.

The container surface resin fed from the injection molding nozzle 9 through the resin flow path 26 into the mold 8 is spread along the core mold 10 through the container bottom forming portion 13 over the container trunk forming portion 12. The container surface resin fed from the injection molding nozzle 9 through the resin flow path 25 into the mold 8 is spread along the cavity mold 11 through the container bottom forming portion 13 over the container trunk forming portion 12 to the container inner side relative to the label film 4 already in-molded.

Furthermore, the gas barrier resin fed through the resin flow path 27 enters the container trunk forming portion 12 through the container bottom forming portion 13, while being guided by and sandwiched between the container surface resin on the side of the core mold 10 and the container surface resin on the side of the cavity mold 11. The gas barrier resin then reaches the position corresponding to the joint 5 of the label film 4, and is spread into the shape of a longitudinal strip to have a certain width spreading thereby to form the strip like plane-shaped gas barrier layer 6.

In the first step, the gas barrier layer 6 is made of the gas barrier resin into the shape of a longitudinal strip as the intermediate layer between two surface layers 28 and 28 made of the container surface resin in the container trunk forming portion 12 in a position corresponding to the joint 5 of the label film 4. At such position only, three layers plus the label film are laminated integrally.

The label film 4 is thus integrated with the surface layer 28 on its rear surface except for such position.

(Second Step)

After the completion of the first step in which the resins are fed by an amount corresponding to and filling with the container trunk forming portion 12 as described above, a second step is successively carried out in which the resins are fed by an amount corresponding to and filling with the container bottom forming portion 13.

In the second step, while the container surface resin is fed into the container bottom forming portion 13, the gas barrier resin is fed into the container bottom forming portion 13 in a plane and sandwiched layer manner. Specifically, a plane-shaped gas barrier layer made of the gas barrier resin is formed in the container bottom as the sandwiched layer, so as to be continuous from the longitudinal strip-shaped gas barrier layer formed in the container trunk portion.

Figure 6:
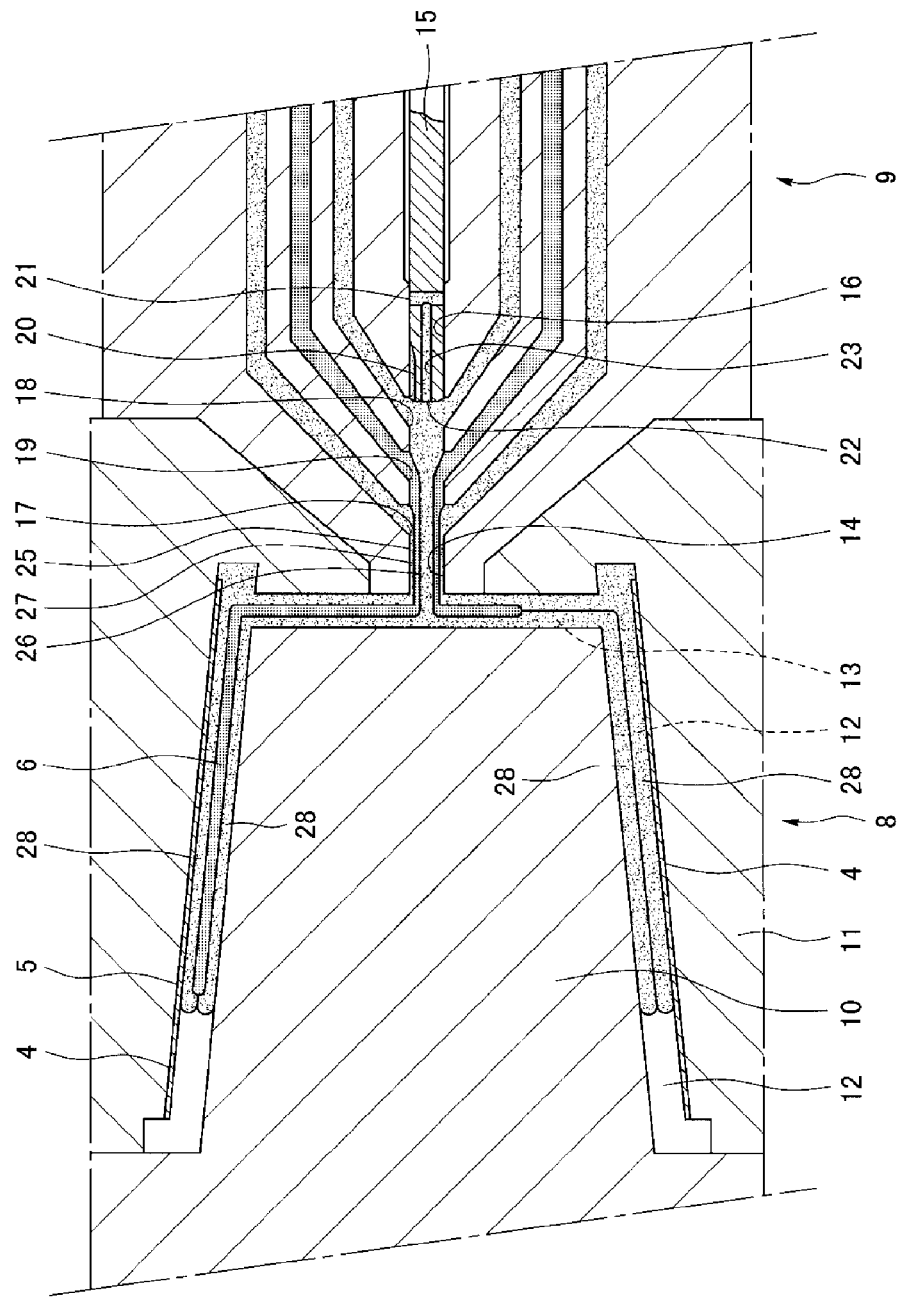
FIG. 6 is an explanatory view schematically showing the mold and the injection nozzle, when feeding a gas barrier resin in a plane manner into a container bottom forming portion in its cross section, by way of example.

FIG. 6 shows a molding state of concurrently forming the container bottom. In the second step after completing the feeding of the resins by an amount corresponding to the amount to fill with the container trunk forming portion 12, the valve pin 15 is moved backward from the position in which the groove 20 faces the third resin discharge port 19 to a position in which the distal end of the valve pin 15 is situated at the rear of the second resin discharge port 18, in order to form the container bottom.

By the backward movement of the valve pin 15 to such a position that the distal end of the valve pin 15 is situated at the rear of the second resin discharge port 18, the first resin discharge port 17, which is in an open state in the first step, keeps open.

The second resin discharge port 18 is also opened so that the container surface resin is directly fed into the pin passage 16.

Furthermore, the third resin discharge port 19 is also opened without being regulated by the valve pin 15, in contrast to the first step, so that the gas barrier resin is directly fed into the pin passage 16.

As a result, all the resin discharge ports 17, 18 and 19 are open to the passage 16 at this second step. And resins are fed through the three ports respectively into the mold.

Since the resins are fed while all of the resin discharge ports are opened, the resin flow paths are formed as follows in the pin passage 16.

That is, the resin flow path 26 of the container surface resin fed from the rearmost second resin discharge port 18 is situated at the center of the pin passage 16. The resin flow path 25 of the container surface resin fed from the foremost first resin discharge port 17 is situated along the inner periphery of the pin passage 16.

The resin flow path 27 of the gas barrier resin fed from the third resin discharge port 19 is formed between the resin flow path 26 leading to the side of the cavity mold 11 and the resin flow path 25 leading to the side of the core mold 10, into the shape of a ring in a direction orthogonal to the resin discharge direction, just as with the resin flow path 25.

The container surface resin fed from the injection molding nozzle 9 through the resin flow path 26 into the mold 8 is spread along the core mold 10 over the container bottom forming portion 13. The container surface resin fed from the injection molding nozzle 9 through the resin flow path 25 into the mold 8 is spread along the cavity mold 11 over the container bottom forming portion 13.

Furthermore, the gas barrier resin fed through the resin flow path 27 enters the container bottom forming portion 13 and is spread in the shape of a plane as the intermediate layer, while being guided by and sandwiched between the container surface resin on the side of the core mold 10 and the container surface resin on the side of the cavity mold 11. Thus, the intermediate layer made of the gas barrier resin is provided all over the entire container bottom forming portion 13.

The second step is ended when the resins are spread over and filling with the entire container bottom forming portion 13.

When the resins are spread over the entire container bottom forming portion 13 in the second step, the container surface resin and the gas barrier resin fed in the first step have already been spread over the entire container trunk forming portion 12, so that the strip-shaped gas barrier layer 6 is formed as the intermediate layer in the position corresponding to the joint 5.

The plane-shaped gas barrier layer 7 made of the gas barrier resin, which is formed in the second step between the two surface layers 28 and 28 made of the container surface resin as the intermediate layer in the container bottom forming portion 13, is continuous from the strip-shaped gas barrier layer 6 formed in the container trunk forming portion 12. That is, the trunk portion and bottom portion of the barrier resin are continuously and integrally formed.

(Third Step)

After the completion of the second step in which the container bottom is formed by feeding the resins by an amount corresponding to the container bottom forming portion 13 of the mold 8, the operation shifts to a third step.

Figure 7:
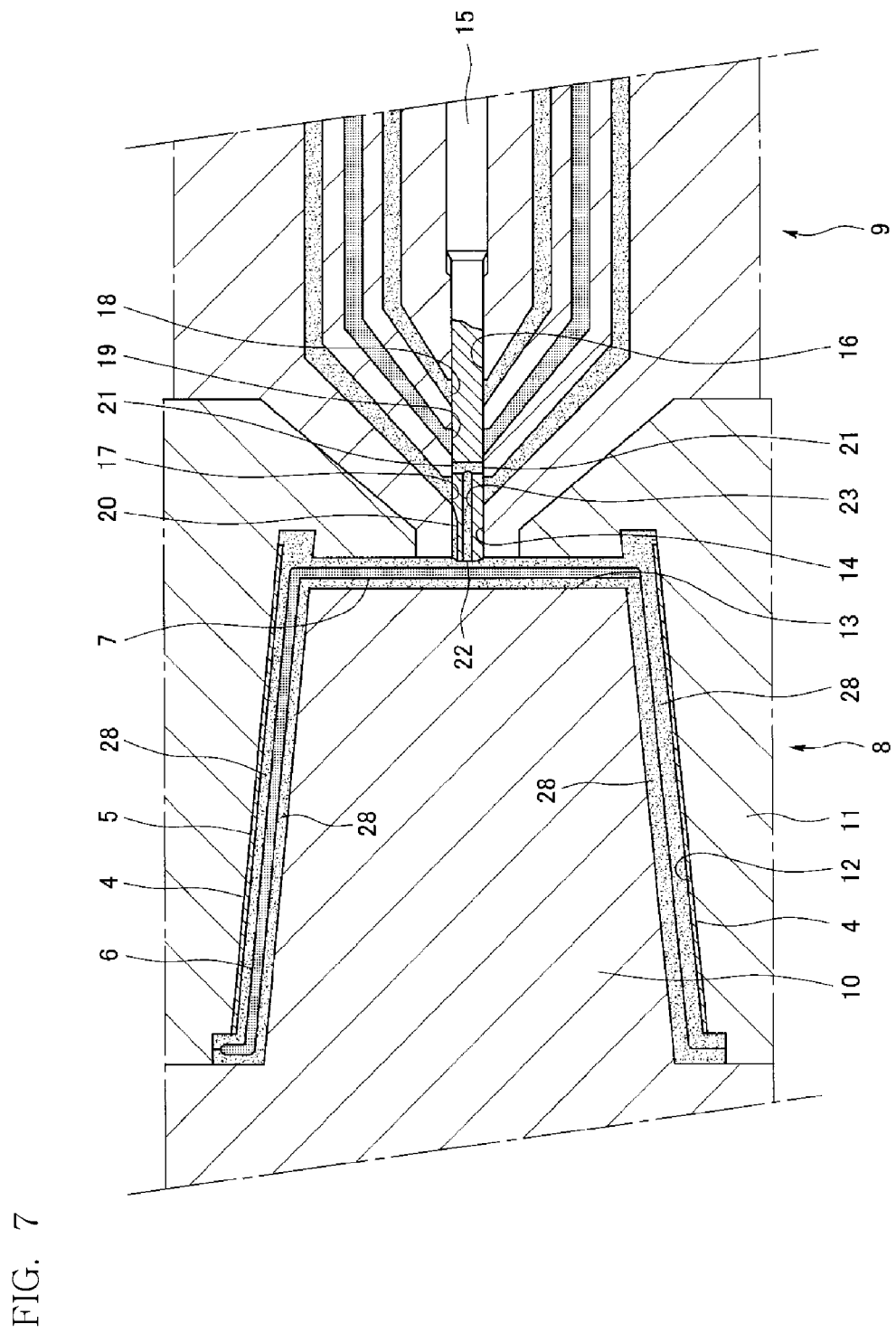
FIG. 7 is an explanatory view schematically showing the mold and the injection nozzle, when completing the feeding of the resins in its cross section, by way of example.

In the third step, as shown in FIG. 7, the valve pin 15 is moved forward from the position in which the distal end thereof is situated at the rear of the second resin discharge port 18.

When the distal end reaches the nozzle gate 14, the forward movement is stopped. Then, the valve pin 15 closes all of the first resin discharge port 17, the third resin discharge port 19, and the second resin discharge port 18, so that the feeding of the container surface resin and the gas barrier resin into the mold 8 is stopped.

After stopping the feeding of the resins in the third step, the mold 8 is maintained in the clamped state for a predetermined time, and the third step is thus ended.

Then, the mold 8 is opened to take out the cup-shaped container 1.

The cup-shaped container 1 is integrally provided with the label film 4 having the gas barrier properties on the outer periphery of the container trunk portion 2.

Also, the longitudinal strip-shaped gas barrier layer 6 is formed as the intermediate layer on the container inner side in the position corresponding to the joint 5 of the label film 4. The plane-shaped gas barrier layer 7 is formed as the intermediate layer in the container bottom 3. The gas barrier layer 6 formed in the container trunk portion 2 and the gas barrier layer 7 formed in the container bottom 3 are continuous with each other.

It is noted that the outer peripheral height of the gas barrier layer that is the intermediate layer in the container bottom can be controlled by changing the ratio between the amount of the resins corresponding to the container trunk forming portion 12 and the amount of the resins corresponding to the container bottom forming portion 13.

What is claimed is:

1. A method for manufacturing a cup-shaped container including a container bottom and a container trunk portion on the container bottom, using a mold having a core mold and a cavity mold between which a container bottom forming portion and a container trunk forming portion are formed for the container bottom and the container trunk portion, respectively, the method comprising:
    disposing a label film on a side of the cavity mold in the container trunk forming portion in the mold, the label film having gas barrier properties and extending along the cavity mold, the label film having a joint portion where both ends of the label film meet;
    injecting a container surface resin into a container inner side in the container trunk forming portion relative to the label film from an injection molding nozzle of which a nozzle gate faces the container bottom forming portion in the mold;
    while injecting the container surface resin, feeding a gas barrier resin into the container trunk forming portion as an intermediate layer between a portion of the container surface resin being spread along the core mold and a portion of the container surface resin being spread along the cavity mold, the intermediate layer being fed to extend along the joint portion of the label film so that a longitudinal stripe-shaped gas barrier layer is formed over the joint portion of the label film; and
    after feeding the gas barrier resin into the container trunk forming portion, while injecting the container surface resin from the injection molding nozzle into the container bottom forming portion in the mold, feeding the gas barrier resin into the container bottom forming portion as the intermediate layer between the portions of the container surface resin to form a plane-shaped gas barrier layer extending radially in the container bottom forming portion, wherein
    the cup-shaped container has the longitudinal strip-shaped gas barrier layer made of the gas barrier resin on the container inner side in the container trunk portion relative to the label film and along the joint portion of the label film, and the plane-shaped gas barrier layer in the container bottom, the longitudinal strip-shaped gas barrier layer and the plane-shaped gas barrier layer being continuous with each other.

2. The method for manufacturing a cup-shaped multilayer container according to claim 1, wherein:
    the injection molding nozzle includes a pin passage that has the nozzle gate at a distal end and a valve pin disposed to be movable in the pin passage;
    a first resin discharge port for the container surface resin faces the pin passage at a foremost position close to the nozzle gate, a second resin discharge port for the container surface resin faces the pin passage at a rear position on an opposite side of the first resin discharge port to the nozzle gate, a resin discharge port for the gas barrier resin faces the pin passage at a midpoint between the first and second resin discharge ports for the container surface resin, and the valve pin is capable of opening or closing the first and second resin discharge ports for the container surface resin and the resin discharge port for the gas barrier resin;
    the valve pin has a groove that is formed in an outer periphery of the valve pin and reaches a distal end of the valve pin, and a communication passage that extends from a communication hole opened in the outer periphery of the valve pin to a discharge port positioned at the distal end of the valve pin;
    when the valve pin is moved backward from a nozzle gate closing position, and the groove of the valve pin faces the resin discharge port for the gas barrier resin so as to open the resin discharge port for the gas barrier resin through the groove, the valve pin situated at the rear of the first resin discharge port opens the first resin discharge port, and the communication hole of the communication passage of the valve pin faces the second resin discharge port so as to open the second resin discharge port;
    opening the first resin discharge port forms a resin flow path in which the container surface resin flows from the first resin discharge port to a side of the cavity mold;
    opening the resin discharge port for the gas barrier resin through the groove forms a resin flow path in which the gas barrier resin flows in a linear manner by being guided through the groove into a portion corresponding to the joint of the label film; and
    opening the second resin discharge port forms a resin flow path in which the container surface resin flows from the second resin discharge port to a side of the core mold by being guided through the communication passage.

3. The method for manufacturing a cup-shaped multilayer container according to claim 2, wherein:
    the multilayer cup-shaped container made of at least three resin layers is manufactured by:
        a first step of moving the valve pin of the injection molding nozzle backward from the nozzle gate closing position to a position in which the groove faces the resin discharge port for the gas barrier resin, to open the first resin discharge port, the second resin discharge port through the communication passage, and the resin discharge port for the gas barrier resin through the groove, so that the container surface resin is fed from the first resin discharge port to the side of the cavity mold, the container surface resin is fed from the second resin discharge port to the side of the core mold, and the gas barrier resin is fed from the resin discharge port for the gas barrier resin into the portion corresponding to the joint of the label film by being guided through the groove, and thereby the container trunk portion that has the longitudinal strip-shaped gas barrier layer made of the gas barrier resin in a portion to be an intermediate layer between the container surface resin on the side of the core mold and the container surface resin on the side of the cavity mold in the position corresponding to the joint of the label film is formed in the container trunk forming portion of the mold;

a second step of, after completing feeding of the resins by an amount corresponding to the container trunk forming portion in the first step, moving the valve pin backward from the position in which the groove faces the resin discharge port for the gas barrier resin to a position at the rear of the second resin discharge port, to open the first and second resin discharge ports and the resin discharge port for the gas barrier resin, so that the container surface resin is fed from the first resin discharge port to the side of the cavity mold, the container surface resin is fed from the second resin discharge port to the side of the core mold, and the gas barrier resin is fed between two layers of the container surface resin, and thereby the container bottom having the plane-shaped gas barrier layer, which is made of the gas barrier resin and continuous from the longitudinal strip-shaped gas barrier layer, is fowled in the container bottom forming portion of the mold in a portion to be the intermediate layer between the container surface resin on the side of the core mold and the container surface resin on the side of the cavity mold; and a third step of, after completing feeding of the resins into the container bottom forming portion of the mold, moving the valve pin forward to close the first and second resin discharge ports and the resin discharge port for the gas barrier resin by the valve pin.

\* \* \* \* \*